April 2, 1940.   B. G. CARLSON   2,195,406

AUTOMATIC PILOT

Filed Feb. 7, 1939

INVENTOR
Bert G. Carlson
BY
Hubert H. Thompson
HIS ATTORNEY.

Patented Apr. 2, 1940

2,195,406

UNITED STATES PATENT OFFICE 2,195,406

AUTOMATIC PILOT

Bert G. Carlson, Freeport, N. Y., assignor to Sperry Gyroscope Company, Inc., Brooklyn, N. Y., a corporation of New York Application February 7, 1939, Serial No. 255,022

3 Claims. (Cl. 114—144)

This invention relates to automatic pilots especially adapted for aircraft, although the same may also be used for ships. As a base line for steering aircraft, it is usual to employ a directional gyroscope which maintains its position in space and it has also been proposed to combine with the same a gyroscope responsive to rate of turn, so as to give both a displacement and a rate signal to control the rudder servomotor.

While in my invention I also propose to use both a fixed base line and a rate gyroscope, I prefer to employ the latter in a different manner than heretofore proposed. According to my invention, I employ the rate gyroscope merely as a substitute for the usual follow-back connection between the rudder and the displacement gyroscope. In this manner I render such follow-back unnecessary and also simplify the construction by bringing both signals on the same pick-off device at the directional gyroscope instead of combining two separate signals at a relay or at the servomotor.

To illustrate my invention, I have shown only the azimuth control unit of an automatic pilot, but it will be understood that my invention may be applied to any one or all three of the axes of control of an aircraft. My invention is also shown as applied to the form of differential air flow pick-off device disclosed in the prior patent of M. F. Bates, B. G. Carlson and Elmer A. Sperry, Jr., No. 1,992,970, dated March 5, 1935, although obviously my invention may be applied to other types of automatic control.

Referring to the drawing, showing one form my invention may assume,

Figure 1:
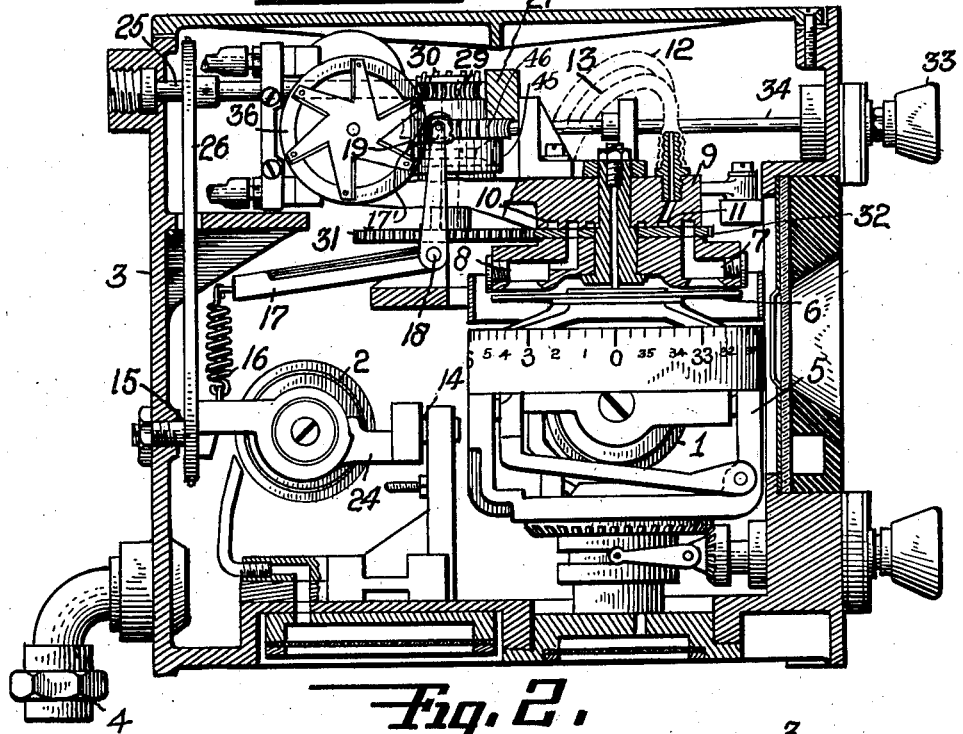
Fig. 1 is a vertical section through the control unit box, showing both the directional gyroscope and rate gyroscope mounted therein.
Figure 2:
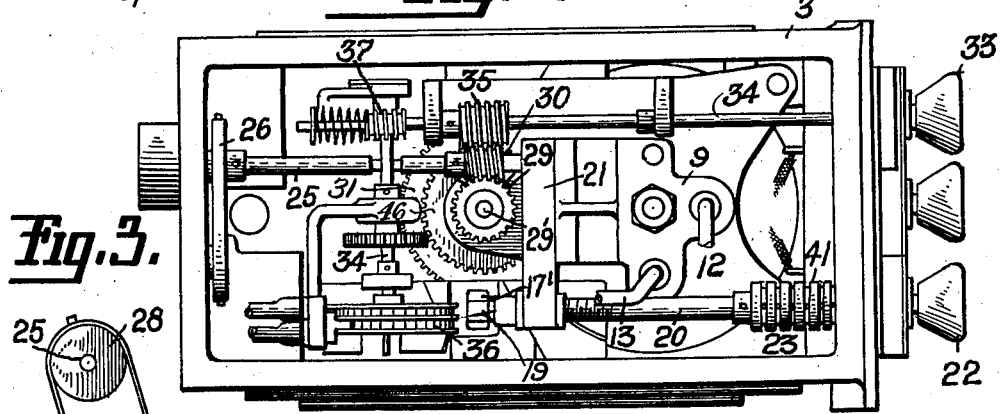
Fig. 2 is a plan view of the same with the top removed.
Figures 3, 4:
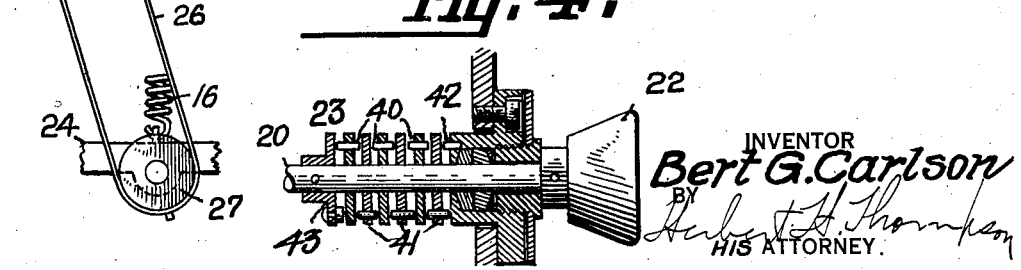
Fig. 3 is a detailed end elevation showing the connection between the rate gyro and the follow-up mechanism.
Fig. 4 is a sectional detail of a limit device used to limit the adjustment of the centralizing spring on the rate gyroscope.

Both the directional gyroscope 1, or other position maintaining means, and the rate of turn gyroscope 2 are shown as enclosed within a common box 3 from which air is continuously exhausted through pipe 4 for the purpose of spinning the gyroscopes and actuating the differential air pick-off control. Said control is shown as of the usual form, in which the vertical ring 5 of the directional gyroscope has thereon a semicircular cut-off plate 6 positioned closely adjacent ports 7 and 8 in the rotatable follow-up member 9, rotatably mounted above the plate 6. Each port is connected through separate concentric channels 10 and 11 with pipes 12 and 13 leading to a relay valve (not shown) for controlling the rudder servomotor. It will be evident, therefore, that upon relative displacement of the stabilized plate 6 and the ports 7 and 8, the differential air flow through pipes 12 and 13 will be disturbed to actuate the relay.

In the usual construction, the follow-up member 9 is turned by follow-back cables leading to the rudder. I prefer, however, to entirely eliminate this follow-back connection and to turn the plate 9 from the rate of turn gyroscope 2. Said gyroscope is shown as mounted for precession about fore and aft axis 14—15 and is normally centralized by a spring 16. Preferably the tension of said spring is adjustable, the upper end being shown as secured to a bell crank lever 17 pivoted at 18, and the upper end 17' of which is forked and is pivotally secured to a collar 19 swiveled on shaft 20, threaded in bracket 21. It will readily be apparent that by rotating the knob 22 on shaft 20, the bell crank lever will be adjusted to vary the tension of the spring. The purpose of the adjustment of spring 16 is to vary the effect of the rate gyroscope so to vary the rate of turn of the craft, the rate gyroscope acting as a speed limiting device as well as a follow-up element. To limit the adjustment of the spring in both directions, I have shown a series of stop pins 40 on collars 41 loosely mounted on shaft 20, the outermost pin engaging a fixed pin 42 in its limiting position. The last collar 43 is fixed to shaft 20, thus permitting the shaft to be rotated several times in either direction, but preventing more than a predetermined number of revolutions thereof.

The rotor bearing frame 24 of the turn gyroscope is connected to shaft 25, as by means of the metal strap 26 which is pinned to a pulley 27 on the rotor bearing frame and also pinned to a pulley 28 on the shaft 25. When the gyroscope precesses in either direction, therefore, the shaft 25 will be turned, which rotates the worm gear 29 on shaft 29' through the worm 30. Shaft 29 turns one arm of a differential gear train 45, the third arm of said train turning a large gear 31 meshing with a similar gear 32 secured to the rotatable ported member 9, so as to turn the same. Hence the member 9 will be rotated, whenever the rate gyro precesses, an amount dependent on the rate of turn of the craft and in a direction which reverses with the direction of turning.

Member 9 may also be turned directly by the change course knob 33, which is shown as mounted on a shaft 34 carrying the worm 35 which meshes with a worm gear 46 secured to the middle arm of said differential gear train 45. Change of course may also be effected from a small reversible air turbine 36 which operates through the same shaft 34 by means of intermeshing worm gearing 37. Said turbine is controlled from a remotely located course change valve (not shown).

As many changes could be made in the above construction and many apparently widely different embodiments of this invention could be made without departing from the scope thereof, it is intended that all matter contained in the above description or shown in the accompanying drawing shall be interpreted as illustrative and not in a limiting sense.

Having described my invention, what I claim and desire to secure by Letters Patent is:

1. In a control unit for automatic pilots for dirigible craft, a position maintaining device, a rate of turn gyroscope, a two part controller at the said device, one part of which is stabilized from said device, and means connecting said gyroscope and the other part of said controller to cause said other part to follow the first part as the craft turns in response to a signal from said controller.

2. In a control unit for automatic pilots as claimed in claim 1 in which said rate gyroscope is provided with a centralizing spring and means for adjusting the tension of said spring to vary to resultant rate of turn of the craft.

3. In a control unit for automatic pilots for dirigible craft, a directional gyroscope, a rate of turn gyroscope adjacent thereto, a differential air-flow two-part pick-off device at said directional gyroscope, one part of which is stabilized therefrom, and a mechanical connection from said rate gyroscope to the other part of said pick-off device causing turning of said other part responsive to turn of the craft.

BERT G. CARLSON.